United States Patent
Haverinen (10) Patent No.: US 11,435,724 B2
(45) Date of Patent: Sep. 6, 2022

(54) AUTOMATION SYSTEM REMOTE ACCESS

(71) Applicant: Valmet Automation Oy, Espoo (FI)

(72) Inventor: Henry Haverinen, Pirkkala (FI)

(73) Assignee: Valmet Automation Oy, Espoo (FI)

( * ) Notice: Subject to any disclaimer, the term of this patent is extended or adjusted under 35 U.S.C. 154(b) by 0 days.

(21) Appl. No.: 15/931,733

(22) Filed: May 14, 2020

(65) Prior Publication Data
US 2020/0363789 A1    Nov. 19, 2020

(30) Foreign Application Priority Data

May 17, 2019   (FI) ................................. 20195408

(51) Int. Cl.
G05B 19/418   (2006.01)
G06F 9/451    (2018.01)
G06F 9/54     (2006.01)

(52) U.S. Cl.
CPC ..... *G05B 19/4183* (2013.01); *G05B 19/4188* (2013.01); *G06F 9/451* (2018.02); *G06F 9/547* (2013.01)

(58) Field of Classification Search
None
See application file for complete search history.

(56) References Cited

U.S. PATENT DOCUMENTS

| | | | |
|---|---|---|---|
| 10,318,404 B2 * | 6/2019 | Glistvain | G06F 8/34 |
| 2002/0091784 A1 | 7/2002 | Baker et al. | |
| 2005/0021839 A1 * | 1/2005 | Russell | H04L 67/025 |
| | | | 709/238 |
| 2011/0046754 A1 | 2/2011 | Bromley et al. | |
| 2014/0273847 A1 | 9/2014 | Nixon et al. | |
| 2016/0050295 A1 | 2/2016 | Neitzel et al. | |
| 2016/0127446 A1 * | 5/2016 | Ito | H04N 1/00949 |
| | | | 709/201 |
| 2017/0093925 A1 * | 3/2017 | Sheretov | H04L 63/0281 |
| 2018/0219849 A1 * | 8/2018 | Jones | H04L 63/083 |

FOREIGN PATENT DOCUMENTS

| | | |
|---|---|---|
| EP | 1353270 A2 | 10/2003 |
| EP | 1906592 A1 | 4/2008 |
| EP | 2146476 A2 | 1/2010 |
| WO | WO2015155581 A1 | 10/2015 |
| WO | WO2015195262 A1 | 12/2015 |

OTHER PUBLICATIONS

Nishanth et al: Development of gateway for industrial controllers. 2017 Innovations in Power and Advanced Computing Technologies (I-PACT), IEEE, Apr. 21, 2017, pp. 1-5.

* cited by examiner

*Primary Examiner* — Charles E Anya
(74) *Attorney, Agent, or Firm* — Laine IP Oy (57) ABSTRACT

According to an example aspect of the present invention, there is provided a method, comprising: performing a second web browser accessible by a first web browser in a remote user device, communicating with a first web application in the first web browser of the user device, performing a second web application in the second web browser configured to communicate with an automation service of an automation system and provide a user interface to the automation service, receiving first feature information from the first web application, and providing, on the basis of the received first feature information, second feature information for adapting the user interface to the automation service for the user device.

18 Claims, 5 Drawing Sheets

AUTOMATION SYSTEM REMOTE ACCESS

FIELD

The invention relates to arranging remote access to an automation system.

BACKGROUND

Industrial automation systems control an industrial process by means of various field devices, e.g. regulating devices, control devices, sensors, transmitters and the like, which are connected to the system. A typical field device is a control valve provided with a valve controller. A field device is typically controlled by a process controller using an appropriate control algorithm on the basis of the measurement results obtained from the process and the set values.

Industrial automation systems require specific and flexible user access system, enabling also remote access to the system. The same automation platform for industrial automation systems needs to work in heterogeneous environments across industries and across customers. The number of various devices and software versions and configurations which may be used for accessing an automation system and need to be supported by the access systems has increased substantially.

SUMMARY OF THE INVENTION

The invention is defined by the features of the independent claims. Some specific embodiments are defined in the dependent claims.

According to a first aspect of the present invention, there is provided an apparatus, comprising a gateway unit for providing a control access to an industrial automation system for a remote user device comprising a first web browser, wherein the gateway unit is configured to establish for the user device a client instance configured at least for: performing a second web browser accessible by the first web browser in the remote user device, communicating with a first web application in the first web browser of the user device, performing a second web application in the second web browser configured to communicate with an automation service of the automation system and provide a user interface to the automation service, receiving first feature information from the first web application, and generating, on the basis of the received first feature information, second feature information to adapt the user interface to the automation service for the user device.

According to a second aspect of the present invention, there is provided a method, which may be performed by a client instance of a gateway unit for providing a control access to an industrial automation system for a remote user device comprising a first web browser, comprising: performing a second web browser accessible by the first web browser in the remote user device, communicating with a first web application in the first web browser of the user device, performing a second web application in the second web browser configured to communicate with an automation service of the automation system and provide a user interface to the automation service, receiving first feature information from the first web application, and generating, on the basis of the received first feature information, second feature information to adapt the user interface to the automation service for the user device.

According to a third aspect, there is provided an apparatus comprising at least one processing core, at least one memory including computer program code, the at least one memory and the computer program code being configured to, with the at least one processing core, cause the apparatus at least to carry out the method or an embodiment of the method.

According to a fourth aspect, there is provided a computer program product, a computer readable medium, or a non-transitory computer readable medium comprising program instructions for causing an apparatus providing a control access to an industrial automation system for: performing a second web browser accessible by a first web browser in a remote user device, communicating with a first web application in the first web browser of the user device, performing a second web application in the second web browser configured to communicate with an automation service of the automation system and provide a user interface to the automation service, receiving first feature information from the first web application, and providing, on the basis of the received first feature information, second feature information to adapt the user interface to the automation service for the user device.

EMBODIMENTS

An industrial automation system may be used for controlling industrial processes such as manufacturing, production, power generation, fabrication, and refining processes. The controlled processes may be fixed to a geolocation or moving, such like vessels. An industrial process may run in continuous, batch, repetitive, or discrete modes. An industrial automation system may also be used for monitoring the shipment or transportation related to an industrial process. An industrial automation system may be distributed to several layers or levels, such as automation platform level and automation application level.

Figure 1:
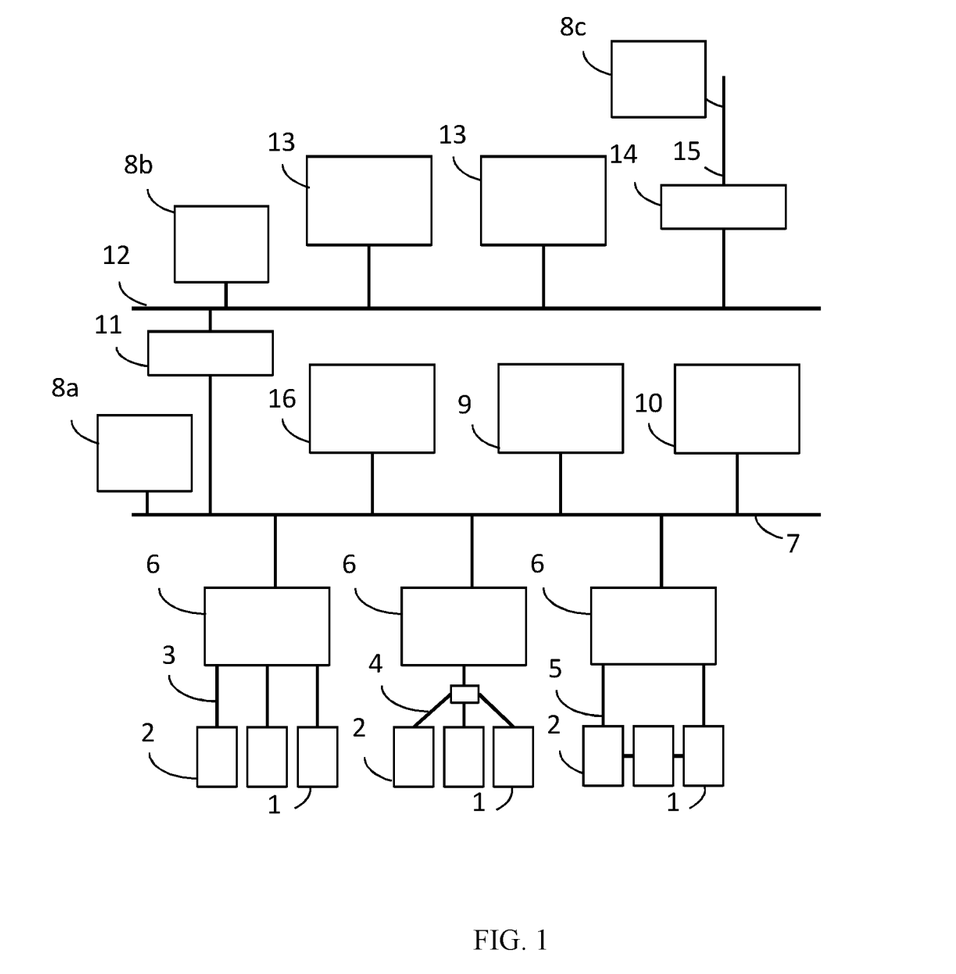
FIG. 1 illustrates an example of an industrial automation system.

FIG. 1 provides an overall view of an example automation system. The automation system comprises of field devices 1 and IO systems 2 that are connected via cabling into (process) controllers 6. The cabling can be direct cabling 3, hub-spoke type of network 4 or ring network 5. The controllers are connected to a system bus 7, which can be redundant. Operator stations 8a, history databases 9, and configuration servers 10 can be attached to the system and the system bus 7. The term user device is applied below to generally refer to a unit by which an operator of an automation system may obtain access to the automation system, such as the operator station 8a directly connected to the system bus 7 or a remotely connected mobile or stationary user device 8b, 8c. The system may comprise further devices, such as a gateway unit 16 connected to the bus 7.

A firewall 11 can be used to protect the system bus 7 from other networks 12, which may be redundant. Maintenance, enterprise resource planning (ERP), configuration and/or simulation servers 13 can be in these networks, for example. The networks may be based on the standard Internet Protocol over Ethernet technology. A further firewall 14 can be used for connection to further networks 15, via which further user devices 8c may access the automation system. The operator unit 8a-8c may comprise a web browser for accessing the automation system. The firewalls 11 and 14 may comprise a demilitarized zone (DMZ) for providing additional level of security.

An automation platform is typically generic and it can be used similarly in many deployments. Automation platform may consist of engineering and configuration tools by which an engineer can design automation applications. Automation platform tools may comprise at least one of the following: a function block diagram design tool, a structured text programming tool, and a user interface design tool. On the other hand, an automation platform may also comprise runtime components such as a process control station (PLC), and human-machine interface (HMI) that can be used to execute the automation application and visualize it to the user.

Automation application, on the other hand, may comprise a configuration that has been created using the tools of the automation platform. Automation application can comprise at least one of the following: a function block diagram, a structured text program, and a user interface design. Depending on the embodiment, an automation application can be unique and completely specific to a customer deployment, or it may also be possible to reuse an automation application across customers and deployments.

Operational components of the automation system, such as the system of FIG. 1, may comprise user interface components, process components and components that support both of the previous. The process components may comprise one or more process controllers 6 and the user interface components may be implemented in and for the user devices 8a-8c. The user device may provide the user interface for the operator for initiating a user session in the automation system and for executing operations directed to a component of the automation system.

The components may implement services that may be accessible to other components and/or services in the automation system. A component or a part of the component may be implemented as software object that may have an operational interface for providing the component as a service to other components in the automation system. The software objects may be distributed and hierarchical object-oriented entities. The operational interface may also be capable of receiving services from one or more other components. The services comprise one or more resources that are specific to the type of the service. In one example, a process component may be implemented as an automation service comprising process data of a controller 6 as a resource and accessible via the gateway unit 16.

For authorizing operations directed to a component of the industrial automation system based on active roles of the user, the industrial automation system may comprise components for supporting the user interface components and process components. The supporting components may comprise a session service, a user authentication service, a user and policy management, and a constraint service, for example.

Services and resources of the automation system may be published as names that can be referred to by other services and clients. The services may be provided using the client-server operation model, where the resources of the services may be accessed by using names of the resources. Clients are capable of executing operations directed to identified services in the automation system. The operations regarding a resource may include, but are not limited to read, write, create, remove, and subscribe.

The implementation of the components may thus follow a client-server operation model, where components acting as clients may issue requests to components acting as servers. A server may process a request for a service received from a client. The processing may comprise authorizing the request and/or executing an operation directed to an automation service. The operation may be executed if the request is authorized, but the operation may not be executed if the request is not authorized. An example of the client-server operation model is provided by operation model followed by a Hyper Text Transfer Protocol (HTTP) client and a HTTP server for requests from the HTTP client and responses from the HTTP server. The HTTP client and HTTP server may have a REpresentational State Transfer (REST) application protocol interface (API) for operations such as reading, writing, removing and adding various types of resources. The HTTP client may issue a request for an operation using the REST API at the HTTP client and the HTTP server may receive the request and process the request using the REST API at the HTTP server. For example, the gateway 16 may comprise a HTTP server and the user device 8b, 8c a HTTP client. The HTTP may also be encrypted as hypertext transfer protocol secure (HTTPS).

The user devices 8b, 8c may comprise different web browsers, such Internet Explorer, Safari or Mozilla Firefox, and further different versions thereof. It is burdensome to take care of compatibility of the automation system with various continuously updated web browser versions. Further, the more there are user devices with different access software configurations, the more challenging it is to ensure data access security.

Figure 2:
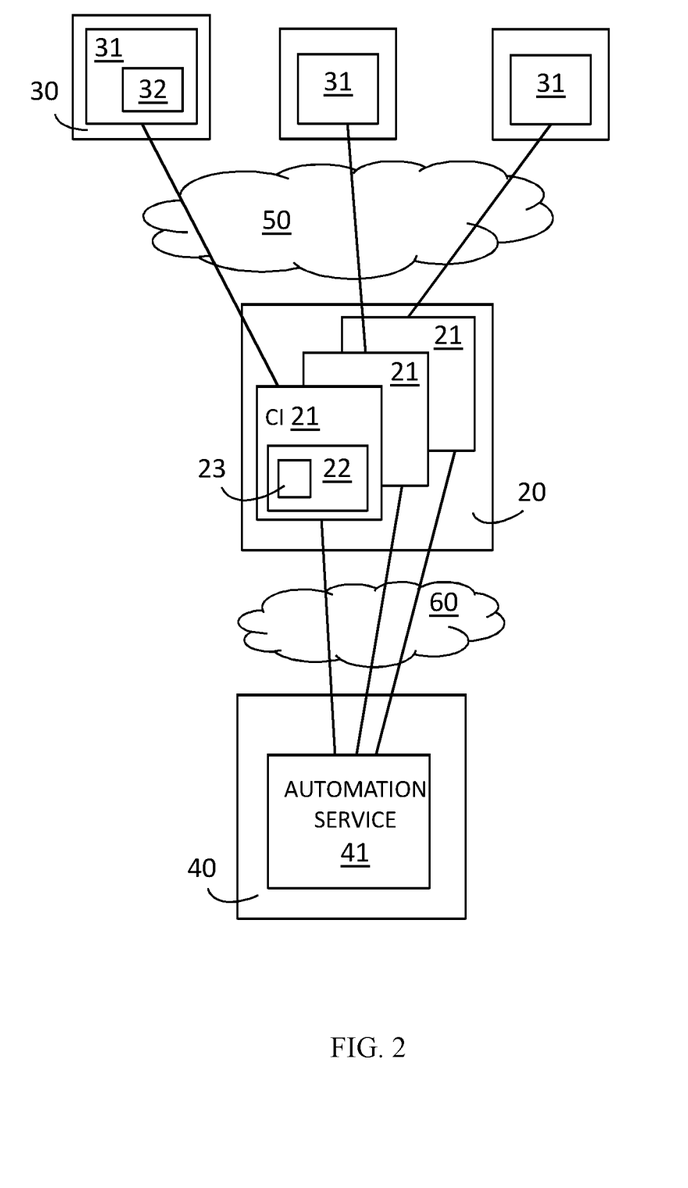
FIG. 2 illustrates an example of a system for remote access to an automation service.

There is now provided an improved system for remotely accessing an automation system with various user devices and software versions. FIG. 2 illustrates an arrangement for providing remote control access to an automation system 40 for a user device 30, such as the user device 8c of FIG. 1.

The user device 30, 8a-c is capable of displaying a graphical user interface to a user. The graphical user interface may be provided by one or more applications executed on the user device and cause displaying the user interface. The applications may comprise a web browser 31. Also further applications may be executed independently or as plugins to provide additional features to the applications, such as the web browser. The applications may be executed on an operating system running on the user device. Examples of the operating systems include Windows operating systems, Linux and OSX. Examples of a user device include mobile phones, tablets, laptop or desktop computers, watches, augmented and/or virtual reality glasses or other wearable devices, and fully or semi-integrated communications devices for vehicle clothes, etc.

The user device 30 is configured to connect over one or more networks 50 to a gateway unit 20, such as the gateway 16 of FIG. 1 or in DMZ areas provided by firewalls 11, 14 or a gateway which is outside of and remote from the automation system. The gateway unit 20 may be configured establish a client instance (CI) 21 for each user device 30 requesting to access an automation service 41. The client instance 21 is configured to provide a (second) web browser 22 accessible by the (first) browser 31 in the respective user device 30. Further, the client instance 21 is configured to communicate with a (first) web application 32 in the respective web browser 31 of the user device. The term web browser is to be understood herein to a complete browser application, an engine for a browser application and being capable of rendering and executing scripts, or browser software configuration with some further functionality (in between the former alternatives).

The CI 21 is configured to communicate with the automation system 40 and the service 41 over one or more networks 60. The CI 21 may perform a (second) web application 23 in the second web browser 22 configured to communicate with the automation service 41 and provide a user interface to the automation service.

The CI 21 is further configured to receive first feature information from the first web application 32. On the basis of the received first feature information, the CI 21 is configured to provide second feature information for adapting the user interface to the automation service for the user device 30. The provision of the second feature information is to be understood broadly to refer to providing of the second feature information for processing, which may involve sending the second feature information to a further (external or internal) processing entity (on the basis of the first feature information). The second feature information may comprise all or some of the first feature information and/or generated by processing the first feature information.

The first feature information may be information received as input to the first web browser 31 via an API of the first web browser. The second feature information may be information received as input to the second web browser 22 via an API of the second web browser. The second feature information may be further provided via the API to the second application 23.

The (provided) second feature information may be directly used by the CI 21 to cause change to the user interface to be provided for the user device 30 (by the first web browser 31 thereof). Thus, the web browser operations in the CI 21 may be controlled on the basis of the second feature information.

In some embodiments, the CI 21 is configured to provide the second feature information to the second web browser 22 to control properties of the second web browser. Thus, the second web browser 22 may adapt to the first feature information, which may comprise fixed and/or dynamically altering user interface feature information.

In some embodiments, the second feature information is provided to second web application 23 and/or further to the automation service 41, which may modify or otherwise adapt the user interface to be provided for the user device 30, e.g. to select the automation service view on the basis of the second feature information.

The feature information may comprise user interface (UI) feature information, such as screen size, touch event support, and/or viewport size. Thus, the second web browser 22 may modify some or all of its UI features accordingly, e.g. to modify the browser window size in accordance with the received screen size of the user device 30 or the first web browser 31 thereof.

The feature information may comprise web browser capability information. In some embodiments, the feature information indicates API information, such as whether an API function is supported or not. For example, a list of supported API functions and connecting client capabilities may be sent from the user device 30 to the CI 21. For example, such API function information may comprise, but not limited to, information of one or more of device API(s), such as a geolocation API, audio API(s), such as a vibration API, and client-side storage API(s).

In an embodiment, the feature information comprises a web browser user agent string. The automation service view may be adapted or selected on the basis of at least some of the information in the user agent string, such as OS/client/engine version information.

In some embodiments, the feature information comprises sensor information on the basis of one or more sensors of the user device 30. For example, the sensor information may comprise orientation information, touch sensor input information, and/or geolocation information. A camera of the user device can also be considered as a sensor providing e.g. the facial image of the user.

Figure 3:
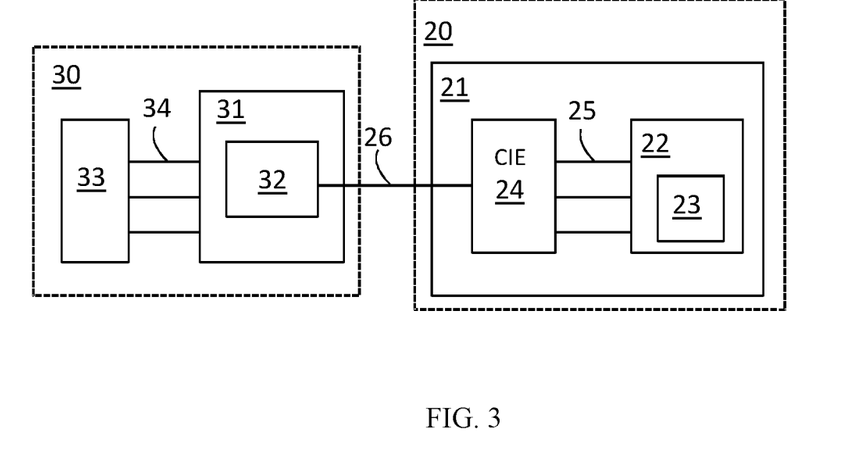
FIG. 3 illustrates elements of the access system according to an embodiment.

FIG. 3 illustrates further the modules and interfaces in the user device 30 and the gateway unit 20 according to some embodiments. The CI 21 comprises a client instance environment CIE 24, which is a functional entity configured to carry out at least the feature information provision.

The CIE 24 may be configured to communicate with the first web application 32 in the user device 30 using a specific protocol 26, which may be referred to as a client instance environment protocol (CIEP). In an embodiment, the CIEP is based on HTTPS. The protocol between the first web application 32 and the CI/CIE 24 can be kept simple, e.g. to comprise mainly screen graphics and simple input events. Therefore, it is easy to test compatibility between the gateway 16, 20 and various brands and versions of user devices 30 and browsers thereof.

The CIE 24 is configured to provide a set of APIs 25 for the second web browser 22. In some embodiments the CI 21 and the CIE 24 are configured to provide support for Java applications and provide JavaScript (JS) APIs. In another example embodiment, the first web browser 31 and/or the second web browser 22 are configured to support WebAssembly, which may be applied for carrying at least some of the presently disclosed features in the respective browser.

FIG. 3 further illustrates that an operating system 33 the user device 30 provides a set of APIs 34 to the first web browser, to be available for the first web application 32. The specific API feature information may be requested by a call to the API by the web application 32, 23 and received via the API. Some further operation examples are provided below.

In some embodiments, the CI 21 is configured to request the first feature information in response to a request from the automation service 41. Thus, the CI 21 may be configured to send a request for the first feature information to the first application 32 in response to a request from the second web application 23. In particular, the CIE 24 may be configured to request the first feature information to be obtained from an API 34 in the user device 30 in response to a call to one of its APIs 25 by the second application 23. The first feature information may then be obtained via the respective API 34 in the user device and sent to the CI 21. The CI may provide the second feature information, which may comprise the first feature information, to the second application 23 configured to send the second feature information to the automation service 40.

Figure 4:
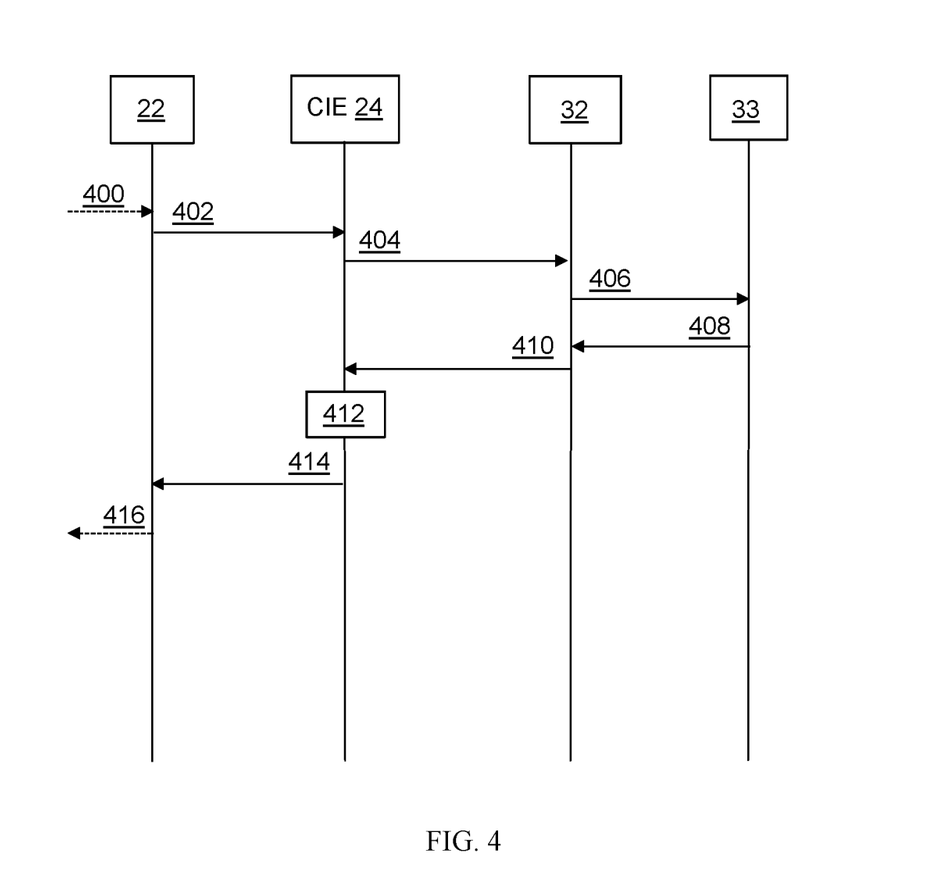
FIG. 4 illustrates component interaction according to an embodiment.

With reference to FIG. 4, the CIE 24 may receive a request 402 for feature information from the second web browser 22. The second web browser 22 may send the request 402 in response to a request 400 from the second web application 23. The request 400 may be triggered based on the request from the automation service 41. The second web application 23 may receive a call for a user device API from the automation service and call an API of the second web browser 22 in response to the received call.

The CIE 24 may be configured to communicate with the first web application 32 in the user device and send a request 404 for the first feature information in response to the request 402, such as a JS API call. The first web application 32 requests 406 the first feature information, e.g. by a JS API call to an OS 33 resource. The first web application 32 receives the first feature information 408 from the OS 33 and sends the first feature information 410 to the CIE 24.

The CIE 24 may generate (or adapt) 412 the second feature information on the basis of the received first feature information 410. In some embodiments, the CIE 24 provides 414 the second feature information for the second web browser 22 via the API associated with the request 402. The second web application 23 may receive the second feature information 416, via the API of the second web browser 22, the information by an application programming interface of the user device, and send it to the automation service 40.

In some embodiments, the CI 21 is configured to receive the first feature information 410 at initiative of the first web application 32 in response to the first application receiving the first feature information via an API of the first web browser 31. Thus, messages 400 to 406 may be omitted and the first feature information may be provided 408 to the first application e.g. in response to receiving changed or new feature information from the OS 33.

Figure 5:
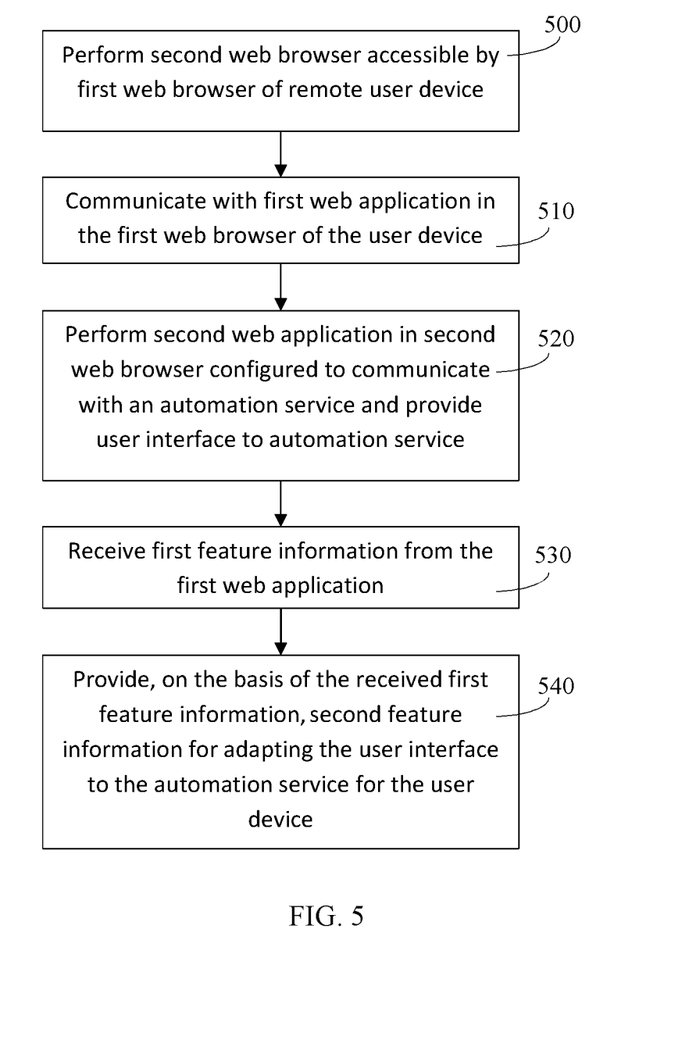
FIG. 5 illustrates a method according to some embodiments.

FIG. 5 illustrates a method according to some embodiments. The method may be carried out by an apparatus configured to serve user devices accessing an automation system, such as the gateway 16, 20 or a further controller or computing unit thereof. The method comprises: performing 500 a second web browser accessible by a first web browser in a remote user device, communicating 510 with a first web application in the first web browser of the user device, performing 520 a second web application in the second web browser configured to communicate with an automation service of the automation system and provide a user interface to the automation service, receiving 530 first feature information from the first web application, and 540 generating, on the basis of the received first feature information, second feature information to adapt the user interface to the automation service for the user device.

It will be appreciated that the method of FIG. 5 may be carried out by the CI 21 of the gateway unit 16, 20, and may be applied with various further embodiments, some of which were illustrated above.

The presently disclosed features provide several advantages. Usability of remote access to a web based automation application can be significantly improved. The user interface to the automation service can be adjusted in accordance with the properties and/or status of a mobile device applied as the user device 30. For example, the user interface may be adjusted from desktop mode or view to features of the mobile device and browser thereof.

A very substantial advantage is that the automation system 40 does not anymore need to support multiple browser brands and versions, thus facilitating less updating. Interoperability of the automation system with new browsers and software versions of user devices 30 does not anymore need to be tested, but it is enough that the gateway 16, 20 is kept up-to-date. Hence, such interoperability support may be outsourced and it is enough that the automation system supports the browser (22) of the gateway. The gateway unit may be a centralized unit serving possibly multiple automation systems. The gateway unit may be applied for multi-vendor environment to provide access to various automation applications from different automation vendors.

Furthermore, security level can be improved, since the remote access has an intermediate point where the access protocol is terminated. There may be at least partially different security measures applied at the frontend (user device side) than at the backend (automation system side). The user cannot easily tamper with (JS) web environment of the first application 32 executed in the user device. The gateway unit provider may carry out security monitoring and provide the first layer of defense against malicious access attempts to the automation system 40. The presently disclosed intervention by the gateway unit also enables to have monitoring functionality to detect and react to malicious access attempts with fake application parameters.

Figure 6:
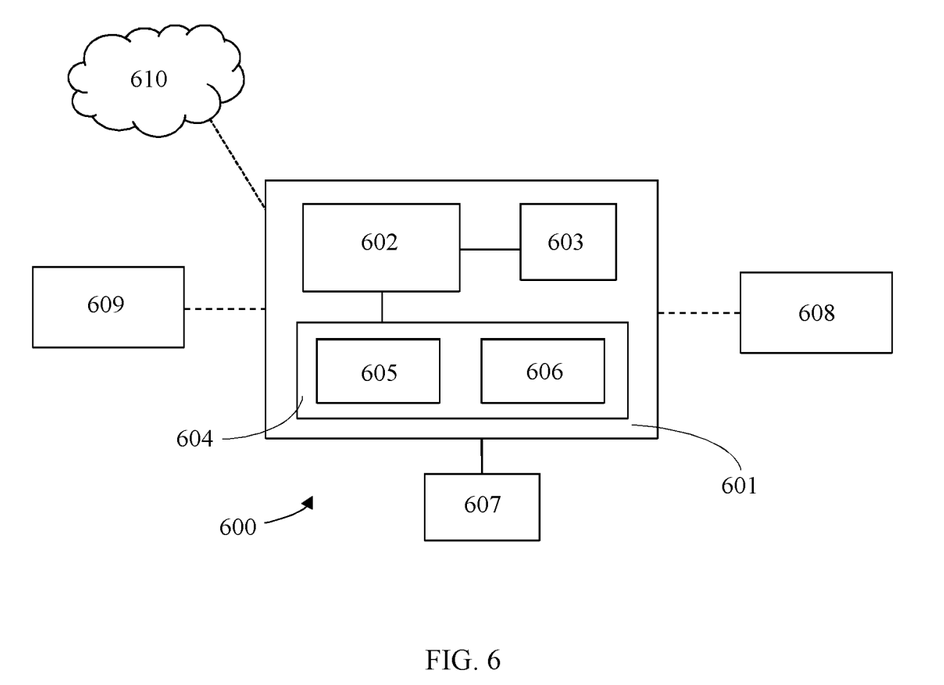
FIG. 6 illustrates an apparatus according to an embodiment.

An electronic device comprising electronic circuitry may be an apparatus for realizing at least some embodiments. FIG. 6 illustrates a schematic diagram of an apparatus 600 according to an embodiment. The apparatus may be configured to operate as or be comprised by the gateway 16, 20 or the user device 30. The apparatus comprises a computing unit 601 and may comprise or be connected to further units, such as one or more user interface (UI) units 609. The apparatus may be connected to (further) automation system control unit(s) 608, other locally or remotely connectable devices 609, and network(s)/service(s) 610, such as a cloud service.

The computing unit 601 may comprise a processor 602, a communications unit 603 and a memory 604. The communication unit 603 may comprise at least one transmitter and receiver, which may be configured to operate in accordance with wired or wireless communication standard, such as global system for mobile communication, GSM, wideband code division multiple access, WCDMA, long term evolution, LTE, 5G or other cellular communications systems, wireless local area network, WLAN, wires short range communication system, and/or Ethernet standards, for example.

The memory 604 may store computer program code 605 and parameters 606 for causing the computing unit to perform at least some of the presently disclosed features, such as the CI 21 and features illustrated in FIG. 5 and further embodiments thereof, when the computer program code is executed by the processor. The memory, processor and computer program code may thus be the means to cause the computing unit 601 to perform at least some of the presently disclosed features related to automation system and service access, such as the feature information provision for adapting the user interface to the automation service 41 for the user device 30.

The UI unit 609 may comprise one or more user interface devices, such as a display and devices, such as one or more of a keyboard, a touch screen, a mouse, a gesture input device or other type input/output device. The UI unit may be configured to display the analyzing results and provide user input for controlling the computing unit 601, e.g. to set parameters affecting one or more of operations illustrated in connection with FIGS. 2 to 5. It will be appreciated that various other data related to the process may be displayed and/or controlled via the UI unit 609, such as web speed, trends, reports, alarms, etc.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Various described features, structures, or characteristics may be combined in any suitable manner in one or more embodiments. While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

The invention claimed is:

1. An apparatus, comprising a gateway unit for providing an access to an industrial automation system for a remote user device comprising a first web browser, wherein the gateway unit is configured to establish for the user device a client instance, wherein the gateway unit comprises the client instance and wherein the client instance is configured to:
   perform a second web browser accessible by the first web browser in the remote user device,
   communicate with a first web application in the first web browser of the user device,
   perform a second web application in the second web browser configured to communicate with an industrial automation service of the industrial automation system and provide a user interface to the automation service for the user device,
   receive first feature information from the first web application, and
   generate, on the basis of the received first feature information, second feature information to adapt the user interface to the automation service for the user device, wherein the client instance is configured to provide the second feature information to the second web browser to control operation of the second web browser, and
   modify user interface features of the second web browser on the basis of the provided feature information comprising user interface feature information associated with the first browser.

2. The apparatus of claim 1, wherein at least one of the first feature information or the second feature information comprises user interface feature information, such as screen or viewport size.

3. The apparatus of claim 1, wherein at least one of the first feature information or the second feature information further comprises application programmer's interface function information.

4. The apparatus of claim 1, wherein at least one of the first feature information or the second feature information further comprises a web browser user agent string.

5. The apparatus of claim 1, wherein the at least one of the first feature information or the second feature information further comprises sensor information on the basis of one or more sensors of the user device.

6. The apparatus of claim 5, wherein the sensor information comprises one or more of orientation information, touch sensor input information or geolocation information.

7. The apparatus of claim 1, wherein the client instance is configured to receive the first feature information at the initiative of the first web application in response to the first web application receiving the first feature information via an application programming interface of the first web browser.

8. The apparatus of claim 1, wherein the client instance is configured to send a request for the first feature information to the first web application in response to a request from the second web application, provide the second feature information comprising the first feature information to the second web application configured to send the second feature information to the automation service.

9. The apparatus of claim 1, wherein the client instance comprises a client instance environment, wherein the client instance environment is configured to:
   communicate with the first web application in the user device,
   generate the second feature information on the basis of the first feature information received from the first web application,
   provide a set of application programming interfaces for the second web browser, and
   provide the second feature information to the second web browser via an application programming interface of the set of the application programming interfaces.

10. The apparatus of claim 1, wherein the client instance is configured to communicate with the first web application by a hypertext transfer protocol secure based client instance environment protocol.

11. A method for a client instance of a gateway unit for an industrial automation system, the method comprising:
   performing a second web browser accessible by a first web browser in a remote user device,
   communicating with a first web application in the first web browser of the user device,
   performing a second web application in the second web browser configured to communicate with an automation service of an automation system and provide a user interface to the automation service for the user device,
   receiving first feature information from the first web application, and
   generating, on the basis of the received first feature information, second feature information for adapting the user interface to the automation service for the user device,
   providing the second feature information to the second web browser to control operation of the second web browser, and
   modifying user interface features of the second web browser on the basis of the provided feature information comprising user interface feature information associated with the first browser.

12. The method of claim 11, further comprising:
   sending a request for the first feature information to the first web application in response to a request from the second web application, and
   providing the second feature information comprising the first feature information to the second application configured to send the second feature information to the automation service.

13. The method of claim 11, wherein at least one of the first feature information or the second feature information further comprises a web browser user agent string.

14. The method of claim 11, wherein the at least one of the first feature information or the second feature information further comprises sensor information on the basis of one or more sensors of the user device.

15. The method of claim 14, wherein the sensor information comprises one or more of orientation information, touch sensor input information or geolocation information.

16. The method of claim 11, wherein the client instance is configured to receive the first feature information at initiative of the first web application in response to the first web application receiving the first feature information via an application programming interface of the first web browser.

17. The method of claim 11, wherein the client instance comprises a client instance environment, wherein the client instance environment is configured to:
   communicate with the first web application in the user device,
   generate the second feature information on the basis of the first feature information received from the first web application,
   provide a set of application programming interfaces for the second web browser, and
   provide the second feature information to the second web browser via an application programming interface of the set of the application programming interfaces.

18. A non-transitory computer readable medium comprising program instructions for causing an apparatus to:
   perform a second web browser accessible by the first web browser in the remote user device,
   communicate with a first web application in the first web browser of the user device,
   perform a second web application in the second web browser configured to communicate with an automation service of the automation system and provide a user interface to the automation service for the user device,
   receive first feature information from the first web application, and
   generate, on the basis of the received first feature information, second feature information for adapting the user interface to the automation service for the user device,
   provide second feature information to control a user interface feature of the second web browser, and
   modify user interface features of the second web browser on the basis of the provided feature information comprising user interface feature information associated with the first browser.

\* \* \* \* \*